United States Patent
Torno et al.

(10) Patent No.: US 7,613,562 B2
(45) Date of Patent: Nov. 3, 2009

(54) SIGNAL PROCESSING DEVICE AND CONTROL UNIT FOR COOPERATING WITH A SIGNAL PROCESSING DEVICE

(75) Inventors: Oskar Torno, Schwieberdingen (DE); Carsten Kluth, Stuttgart (DE); Werner Haeming, Neudenau (DE); Heiko Ridderbusch, Stuttgart Moehringen (DE); Crina Vlad, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 575 days.

(21) Appl. No.: 10/541,517

(22) PCT Filed: Oct. 8, 2003

(86) PCT No.: PCT/DE03/03328

§ 371 (c)(1),
(2), (4) Date: Mar. 1, 2006

(87) PCT Pub. No.: WO2004/061283

PCT Pub. Date: Jul. 22, 2004

(65) Prior Publication Data

US 2006/0200299 A1    Sep. 7, 2006

(30) Foreign Application Priority Data

Jan. 7, 2003    (DE) ................. 103 00 133

(51) Int. Cl.
*G06F 19/00*    (2006.01)
*G06G 7/70*    (2006.01)

(52) U.S. Cl. .................. 701/111; 123/406.21

(58) Field of Classification Search ......... 701/110–111, 701/114; 123/406.21, 406.35
See application file for complete search history.

(56) References Cited

U.S. PATENT DOCUMENTS

| | | | | | |
|---|---|---|---|---|---|
| 4,269,155 | A | * | 5/1981 | Iwata et al. | 123/406.39 |
| 4,274,379 | A | * | 6/1981 | Iwata et al. | 123/406.39 |
| 4,445,479 | A | * | 5/1984 | Takakuwa et al. | 123/406.21 |
| 4,644,918 | A | * | 2/1987 | McDermott | 123/406.37 |
| 4,811,714 | A | * | 3/1989 | Akasu | 123/406.29 |
| 5,404,854 | A | | 4/1995 | Kamabora et al. | |
| 6,640,259 | B2 | | 10/2003 | Nakamoto et al. | |
| 6,722,343 | B2 | * | 4/2004 | Uchida et al. | 123/406.33 |
| 7,051,711 | B2 | | 5/2006 | Sauler et al. | |

FOREIGN PATENT DOCUMENTS

| | | |
|---|---|---|
| DE | 10036643 | 2/2002 |
| DE | 101 38 110 | 3/2002 |
| DE | 101 19 196 | 5/2002 |
| DE | 100 65 297 | 7/2002 |
| EP | 0 539 071 | 4/1993 |
| EP | 0 592 983 | 4/1994 |

* cited by examiner

*Primary Examiner*—Hieu T Vo
(74) *Attorney, Agent, or Firm*—Kenyon & Kenyon LLP

(57) ABSTRACT

A signal processing device and a control unit for cooperating with a signal processing device are described, the signal processing device being designed for processing knocking signals of an internal combustion engine which are provided by knocking sensors. A comprehensive check for errors is performed. The filter coefficients provided for a filter in the signal processing device are checked for consistency. Furthermore, messages between control unit and signal processing device are checked for transmission errors. If errors occur, alternate measures are initiated.

17 Claims, 4 Drawing Sheets

SIGNAL PROCESSING DEVICE AND CONTROL UNIT FOR COOPERATING WITH A SIGNAL PROCESSING DEVICE

FIELD OF THE INVENTION

The present invention is directed to a signal processing device and a control unit for cooperating with a signal processing device.

BACKGROUND INFORMATION

German Published Patent Application No. 101 38 110 describes a signal processing device and a control unit for cooperating with a signal processing device, the signal processing device being designed for processing knocking signals of an internal combustion engine. The signal processing device has a filter which processes the knocking signals of the internal combustion engine. The control unit provides control information which influences the properties of the filter. In particular, the frequency of a pass range of the filter may be influenced.

SUMMARY OF THE INVENTION

The signal processing device of the present invention and the control unit of the present invention has the advantage over the related art that increased reliability in processing the knocking signals is ensured together with high flexibility of the filters. This is particularly advantageous if particularly complex filter functions are implemented by different pieces of control information. Even partial modifications of the control information may result in severely different filter properties.

It is particularly advantageous if the signal processing device verifies control information received from the control unit. Furthermore, the control information stored in the signal processing device may be examined for consistency each time the signal processing device is used. Defective memory areas may thus be identified. This is particularly true if the control information contains a plurality of filter coefficients. A control unit is able to better control an internal combustion engine due to the improved processing of the knocking signals. As an alternate measure, it is possible to modify the evaluation of the knocking signals of the internal combustion engine. Another alternate measure may include modifying the control of the internal combustion engine. This is accomplished, for example, by modifying, in particular retarding, the ignition angle.

DETAILED DESCRIPTION

Figure 1:
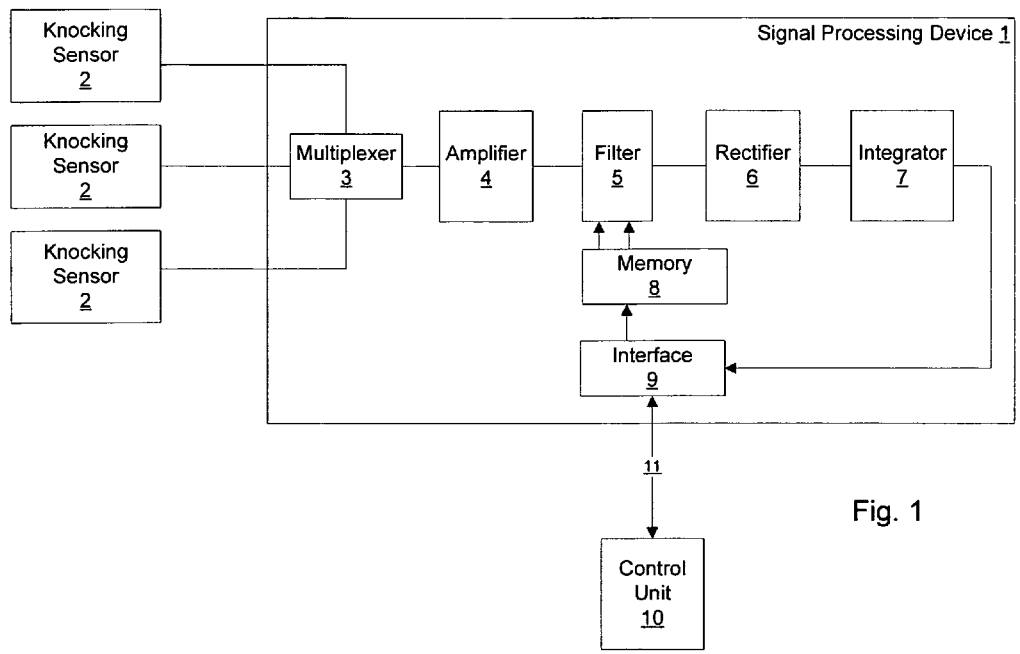
FIG. 1 shows a plurality of knocking sensors, a signal processing device, and a control unit.

FIG. 1 schematically shows a signal processing device 1 for evaluating the signals of knocking sensors 2, and a control unit 10. Knocking sensors 2 are mounted on the internal combustion engine (not shown here) in the customary manner. Knocking sensors 2 deliver knocking signals, i.e., signals providing information about the combustion process in the cylinders of the internal combustion engine. In particular, an undesirably high increase in pressure, such as may occur due to self-ignition of the mixture (known as knocking) may be detected. The signals of the knocking sensors are supplied to signal processing device 1 and further processed there. Signal processing device 1 has a plurality of inputs for knocking sensors 2.

A multiplexer 3, i.e., a device which selects a suitable signal from the signals of different knocking sensors 2, is connected downstream from the inputs. This is justified by the fact that the combustion processes in the cylinders do not occur simultaneously, but rather sequentially, one after the other, so that no simultaneous processing of the signals of all knocking sensors 2 is required, and these may rather be processed sequentially. An amplifier 4, in which the signals of knocking sensors 2 are amplified, is connected downstream from multiplexer 3. A filter 5, in which the signals of the knocking sensor are filtered, is connected downstream from amplifier 4. Since the knocking signals, i.e., the signals of the abnormal combustion processes, have a specific frequency, this filter 5 is designed in a frequency-selective manner, i.e., only the signals having specific frequencies are allowed to pass. A rectifier 6, in which the knocking signals are rectified, is connected downstream from filter 5. An integrator 7, in which the knocking signals are integrated over a defined period of time, is connected downstream from rectifier 6. The thus integrated signal is a measure of the intensity of the knocking signals, i.e., of the presence of knocking combustion processes in each of the cylinders to which knocking sensors 2 are assigned. It may thus be determined whether knocking combustion occurred by comparing the integrated signal with a comparison value. The integrated knocking signal from the output of integrator 7 is forwarded to an interface 9. Interface 9 is designed for communication with external control unit 10 and is able to transmit the integrated knocking signal to control unit 10. Interface 9 is preferably designed as a serial interface. Interface 9 is furthermore connected to a memory 8. Filter coefficients for influencing filter 5 are provided in this memory 8. These filter coefficients are explained in more detail in FIG. 2.

FIG. 1 shows signal processing device 1 and control unit 10 as two separate units. In many actual applications, these two devices are provided separately in different housings. However, it is also possible to provide both devices 1 and 10 in a single housing and to provide them with a shared power supply. Also in this case, the communication between signal processing device 1 and control unit 10 takes place via a bus, the "control unit" being the main computer in the shared housing in this instance. The advantage of configuration in a shared housing is the cost-effective design. Signal processing device 1 may be combined with a control unit 10 as an additional module in a simple manner.

The system having multiplexer 3, amplifier 4, filter 5, rectifier 6, and integrator 7 corresponds to the system known from German Published Patent Application No. 101 38 110. These elements are illustrated here as discrete elements. However, they may also be provided as software; in particular, the functionalities of filter 5 may be represented by appropriate software in a particularly simple manner. To do so, the knocking signals must be present as digital signals. Therefore, analog-digital converters must be provided to appropriately convert the signals of knocking sensors 2. Those skilled in the art are familiar with a plurality of possible configurations of these analog-digital converters. They may be situated directly in knocking sensors 2, for example. Alternatively, an analog-digital converter may also be situated between amplifier 4 and filter 5, for example.

Messages are exchanged between interface 9 and control unit 10 via bus lines 11. Filter coefficients are transmitted by control unit 10 to interface 9 and thus to signal processing device 1. The present invention proposes that this transmission of the filter coefficients be verified to ensure that the filter coefficients are transmitted correctly. Furthermore, the thus transmitted filter coefficients are saved in memory 8 and then made available for each filtering operation by filter 5. Memory 8 is thus designed to receive and save data from interface 9. Typically the filter coefficients are transmitted from control unit 10 to signal processing device 1 during initialization, i.e., when the motor vehicle is started, control unit 10 and signal processing device 1 are reset and filter coefficients are then transmitted by control unit 10. The filter coefficients are then saved in memory 8. The filter coefficients saved in memory 8 may be modified by interference in individual memory cells. Therefore, it is desirable to subject the contents of memory 8 to constant monitoring to ensure that the filter coefficients are not modified due to a failure or modification of a memory cell. Therefore, the present invention proposes checking the filter coefficients saved in memory 8.

It is therefore proposed to represent the filter coefficients by an appropriate binary code designed at least as an error-detecting code. Typical error-detecting codes have a parity bit, for example. Changes in individual bits are reliably recognized via individual parity bits. In the case of thus coded filter coefficients, the transmitted or stored filter coefficients may thus be checked for errors both at the time of transmission from control unit 10 to interface 9 as well as in memory 8. As soon as an error is detected in these filter coefficients, alternate measures are taken to ensure that abnormal combustion processes are reliably recognized by the knocking control, or that the engine is not operated in operating states in which such combustion processes may occur. Accordingly, a check is performed at the time of each transmission of filter coefficients and either at the time of each filtering or from time to time (after every ten filtering operations) whether the filter coefficients saved in memory 8 are still correct or whether this data has been modified by an error in the memory cells. This is also accomplished by checking the saved data containing the error-detecting code, for example, by comparing a parity bit with the corresponding data.

Furthermore, the feedback of signal processing device 1 to control unit 10 should also be checked. In a particularly simple case, the integrated value as determined by integrator 7 in a predefined time period may be simply transmitted by signal processing device 1 to control unit 10. Alternatively, it is also possible for the data to first be preprocessed in signal processing device 1 and then for the preprocessed data to be transmitted to control unit 10. Also in this case the information transmitted from interface 9 to the control unit must be coded with an error-detecting code to then determine in the control unit whether the data has been correctly transmitted. In particular in a motor vehicle, interference may occur during transmission between interface 9 and control unit 10. Depending on the frequency of errors, different measures may then be taken. For example, in the event of individual errors in the transmission, the instantaneous ignition angle value provided by the knocking control may be simply maintained, i.e., the ignition angle is no longer advanced as it would be otherwise given a lack of knocking events. However, if the total number of errors exceeds a certain value, control unit 10 activates a safer operating range, i.e., only ignition angles in which the risk for undesirable combustion processes in the cylinders is eliminated.

It is also possible to transmit control signals from control unit 10 to signal processing device 1 for each individual combustion process. The thus transmitted control data must also be monitored for errors in the data transmission.

Figure 2:
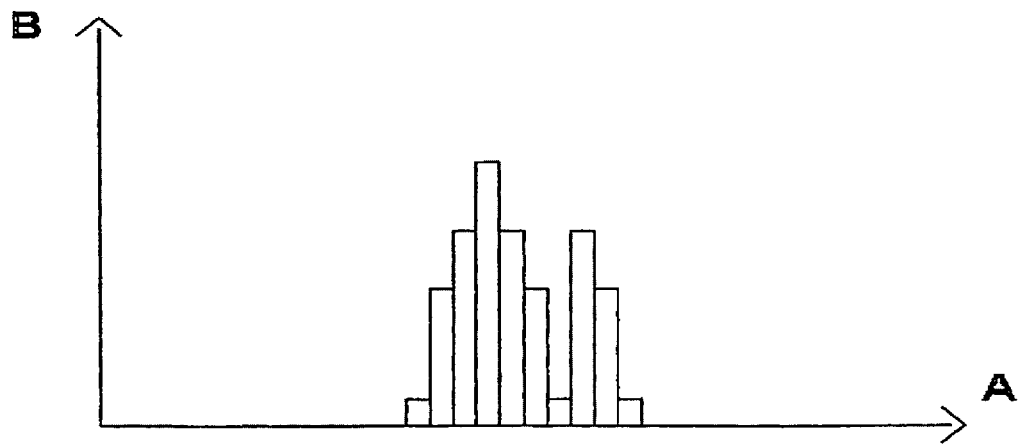
FIG. 2 shows filter coefficients which are used for the filter of the signal processing device.

The diagram of FIG. 2 shows a set of filter coefficients for filter 5. Frequencies are plotted on axis A, and amplification factors are plotted on axis B. It is evident that the filter coefficients represent amplification factors assigned to certain frequency ranges. The filter coefficients thus contain information about which frequency range they are to be assigned to and about the extent of the amplification for this frequency range. This is normally provided using binary numbers. For example, amplification intensities between 0 and 255 may be coded via an eight-bit long binary number.

Figure 3:
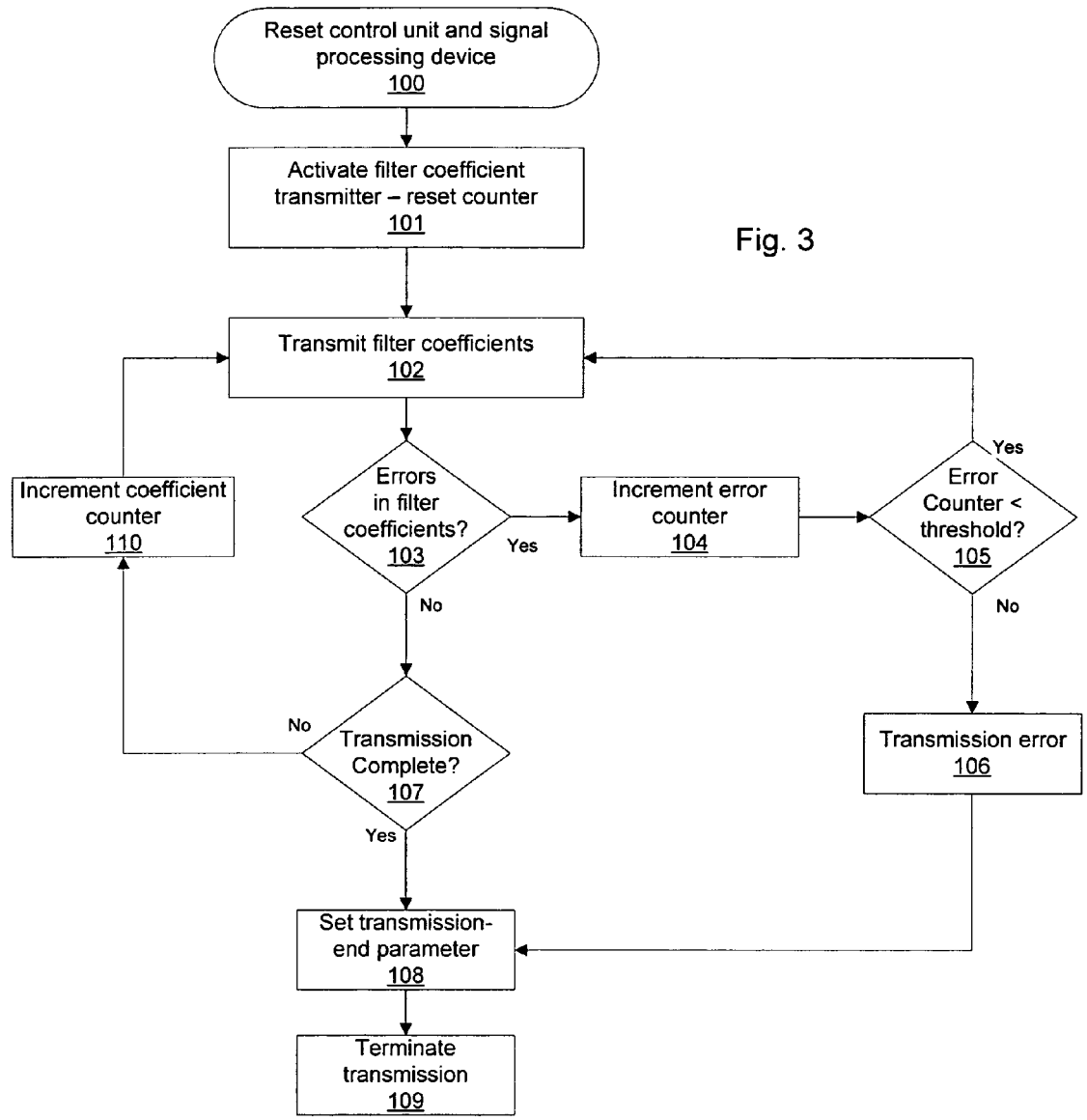
FIGS. 3, 4, and 5 show different methods executed by the signal processing device according to the present invention and the control unit according to the present invention.

FIG. 3 shows a first method for checking the admissible transmission of filter coefficients between control unit 10 and signal processing device 1. It is assumed here that a complete set of filter coefficients is transmitted from control unit 10 to the signal processing device when starting a motor vehicle and that this data is checked. In a first method step 100, the entire system is started by resetting both control unit 10 and signal processing device 1. This step 100 is typically triggered by the start of the internal combustion engine. In following step 101, the transmission of filter coefficients is activated. Furthermore, a counter which counts the number of successfully transmitted filter coefficients is reset to a start value. In following method step 102, a first block of filter coefficients is transmitted from control unit 10 to interface 9. Such a block of filter coefficients typically contains a filter coefficient and an appropriate check bit, for example, a parity bit. In following step 103, a check is performed to determine whether the block of filter coefficients has been transmitted error-free. This is accomplished using the check bit in particular. If this check determines that the transmission was error-free, block 107 follows, in which a check is performed to determine whether all filter coefficients have been transmitted. This is accomplished in particular using the filter coefficient counter which was set to a start value in program block 101. If all filter coefficients have not yet been transmitted, program block 110 follows, in which the appropriate filter coefficient counter is incremented. The next block of filter coefficients is then transmitted in step 102. If it is determined in step 103 that the filter coefficient(s) of the block were not transmitted error-free, step 104 follows. In step 104, an error counter is incremented. In following step 105, the error counter is queried and compared in particular to a comparison value. If the error counter is still below the comparison value, step 102 follows step 105, i.e., a new attempt is made at transmitting the corresponding filter coefficients. If it is determined in step 105 that the error has occurred several times consecutively, in particular that the error counter exceeds a certain comparison value, step 106 follows. In step 106, it is determined that the transmission of filter coefficients is affected by errors. Alternate measures may be taken on the basis of this determination. Steps 106 and 107 are followed by step 108, in which the end of the transmission of filter coefficients is recorded by setting an appropriate parameter. Depending on whether the transmission was successful or not, further procedures follow which either use the successfully transmitted filter coefficients or initiate alternate measures. Step 108 is followed by step 109, in which the transmission of filter coefficients is terminated.

The method described in FIG. 3 thus ensures that no modification of the filter coefficients occurs in the transmission of filter coefficients from the control unit to the signal processing device. Since even the modification of individual bits may cause important changes in the filter coefficients, this ensures that the filter coefficients are transmitted correctly. The method of FIG. 3 is intended mainly for use at the time of the start of the internal combustion engine when a complete set of filter coefficients is transmitted, which is then used for the subsequent operation. This complete set of filter coefficients is then saved in memory 8 of signal processing device 1 and used in the ongoing operation for filter 5.

Figure 4:
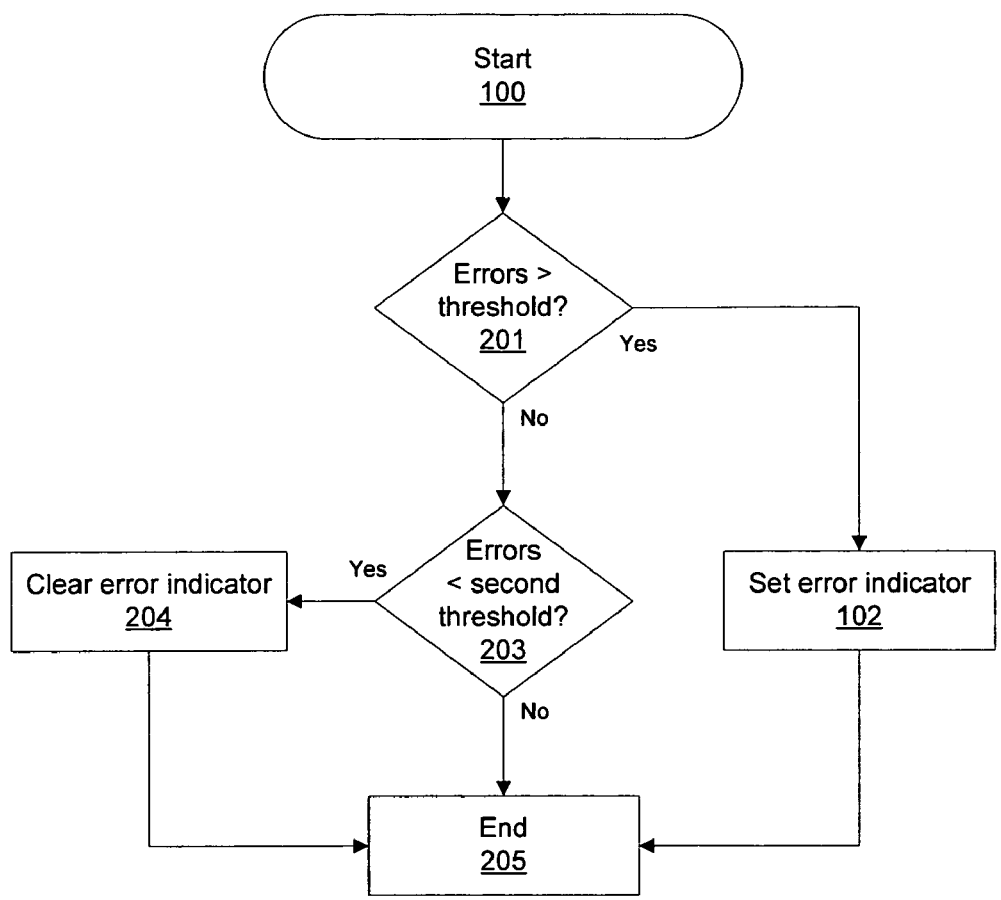

FIG. 4 shows another method, which is used for checking the filter coefficients for filter 5 saved in memory 8. Errors may occur not only during the transmission of data from the control unit to interface 9, but also in the memory 8. For this purpose, every time filter coefficients are called from memory 8, a check is performed to determine whether the filter coefficients agree with the also saved error detection bits, in particular parity bits. Whenever a deviation is determined here, the erroneous coefficient is retransmitted from control unit 10 to signal processing device 1. FIG. 4 shows a method to determine whether the number of such errors within a monitoring period, for example, 250 filtering cycles, exceeds a threshold value. For this purpose, the method illustrated in FIG. 4 is started in step 200 depending on the predefined number of filtering cycles, or ignition cycles of the internal combustion engine. After the start in block 200, step 201 follows, in which the number of errors is compared to a predefined threshold value. The error count is incremented whenever, upon reading a filter coefficient from memory 8, a disagreement between the saved filter coefficient and the corresponding parity bit is determined. If the number of errors is greater than the threshold value, step 202 follows step 201. In step 202, an indicator is set to show that the number of errors has exceeded the threshold value. If in step 201 the number of errors is still less than the threshold value, step 203 follows step 201. In step 203, it is determined whether the number of errors is less than a second threshold value. The second threshold value is, of course, less than the threshold value checked in step 201. In block 203, it is preferably determined that absolutely no errors occurred in the most recent monitoring period. If this is the case, step 203 is followed by step 204, in which the indicator showing an error is reset. If it was not determined in block 203 that the number of errors is less than a second threshold value or that absolutely no errors occurred during the monitoring period, step 203 is directly followed by step 205, in which the method of FIG. 4 is terminated. Steps 202, 204 are also followed by step 205, in which the method is terminated.

Thus, according to the method of FIG. 4, if the number of errors exceeds a first threshold value, an indicator is set on the basis of which alternate measures may then be provided for regular knocking control. These alternate measures are stopped only when the number of errors in the monitoring period drops below a second smaller value. In this case the alternate measures are preferably only stopped if absolutely no errors have occurred in the monitoring period.

Several procedures are conceivable as alternate measures. First, the internal combustion engine may be operated only in an operating range in which no more knocking occurs. In particular, the ignition angle may be retarded for safety in this case. Alternatively, it may also be determined in which area of the memory an error repeatedly occurs and this area may then be blocked. Alternatively, other filter coefficients, for example, standard filter coefficients, may be used or another area of memory 8 may be used for saving the filter coefficients. In this case, the filter coefficients are again requested from the control unit.

Figure 5:
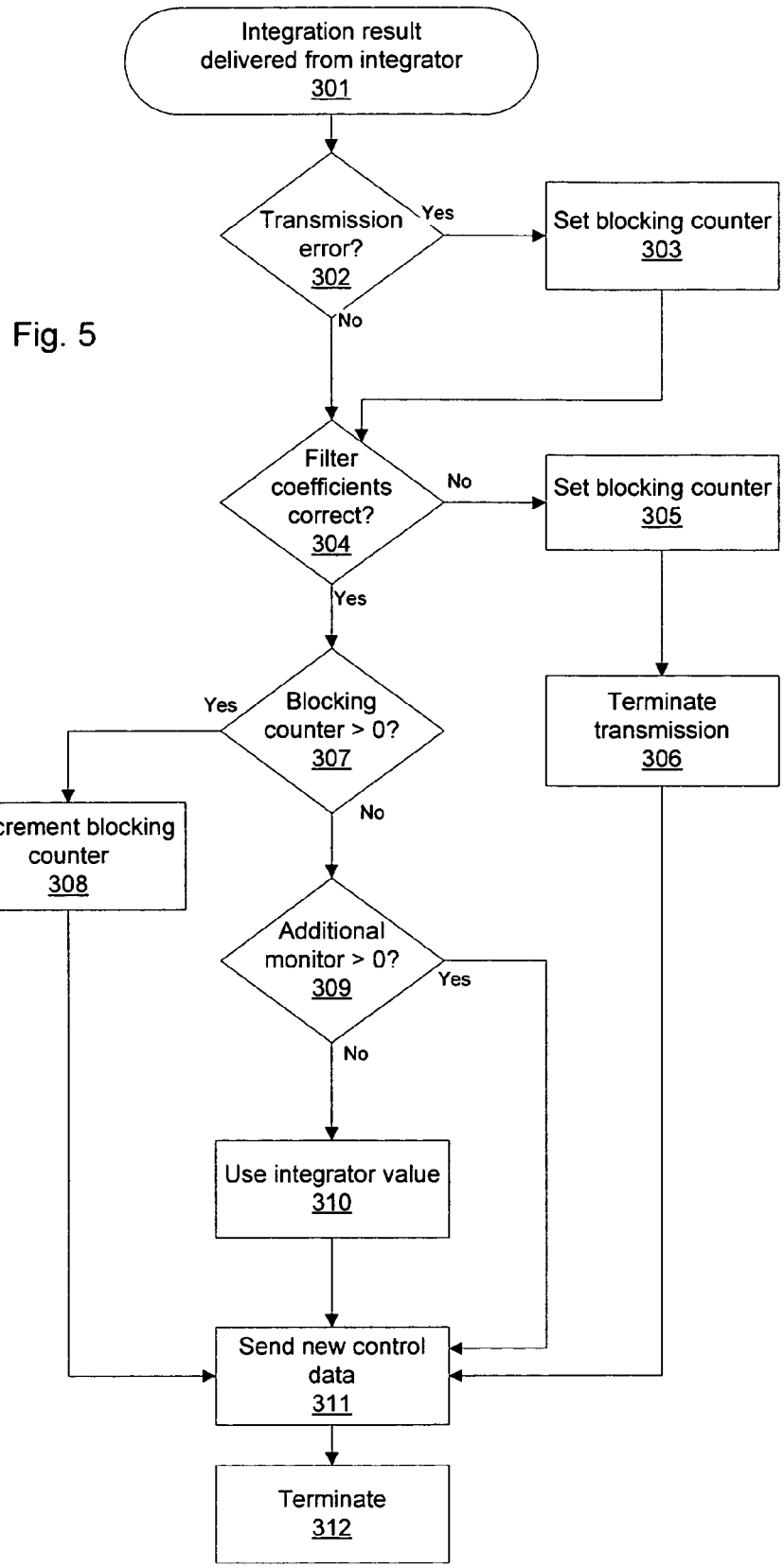

FIG. 5 shows another method for checking the communication between signal processing device 1 and control unit 10. This method assumes the transmission of control signals from control unit 10 to signal processing device 1 for each measurement. The method of FIG. 5 starts with block 301 at the end of each measurement window, i.e., whenever integrator 7 has delivered an integration result, which is then transmitted to control unit 10 via interface 9. In following step 302, it is then checked whether an error occurred when the message was transmitted. This is performed, for example, by checking the parity bit and the message for consistency. If it is determined that an error occurred when the message was transmitted, step 303 follows. In step 303, a blocking counter is set to a predefined value, for example, 3. Step 303 is followed by step 304. Step 304 also follows if it was determined in step 302 that no error occurred in the message transmitted from signal processing device to control unit 10. Step 304 checks whether the filter coefficients used for computing the integration result were correct, i.e., whether the control data transmitted for the corresponding measurement were correct or whether the filter coefficients read from memory 8 were correct. This information is part of the message transmitted from signal processing device 1 to the control unit. If this message contains the information that an error has occurred, step 304 is followed by step 305, in which a blocking counter is again set to a predefined value, for example, 3. If this message contains no indication of an error, step 304 is followed by step 307, in which a check is performed to determine whether the blocking counter, which was set in step 305 or step 303, for example, has again assumed the value 0. If the blocking counter has not yet assumed the value 0, step 307 is followed by step 308, in which the value of the blocking counter is decremented by 1. If the blocking counter is at the value 0, step 307 is followed by step 309, in which an additional monitor value is queried. This monitor value may be set to a value>0 by other method steps which are not illustrated here, for example, if all filter coefficients have not yet been transmitted, if other errors have occurred, or if for example the knocking control is operated in a test mode. If this knocking monitor has the value 0, step 309 is followed by step 310, in which the integrator value transmitted by control unit 10 is used for computing control variables for the internal combustion engine. This means that actual knocking detection or knocking control only takes place if the integrator value has been transmitted free of errors (step 302), at the same time the information that correct filter coefficients have been used is contained in the message (step 304), the most recent error message was a sufficiently long time ago (suggested here: three events) (step 307), and a knocking monitor (309) indicates an activated knocking control function. In all other cases, no knocking control takes place. Step 305 is initially followed by step 306, in which the erroneous filter coefficient is retransmitted from control unit 10 to interface 9. Step 311 follows steps 306, 310, and 308, respectively, provided that the knocking monitor is not recognized as activated in step 309. In step 311, new control data is sent from the control unit to signal processing device 1 as the basis for the subsequent evaluation of knocking signals. After step 311, the method is terminated in step 312.

Therefore, this method assumes the transmission of corresponding control data from control unit 10 to signal processing device 1 for each evaluation of knocking signals. In the case of one-time transmission from control unit 10 to signal processing device 1 (for example, in the event of initialization), the method steps based on repeat transmission may simply be omitted. Furthermore, the control unit checks whether errors occurred in the transmission from signal processing device 1 to control unit 10. The control unit also evaluates whether the signal processing device has recognized internal errors. It is thus ensured that the knocking control uses extremely reliable data regarding knocking events. The reliability of knocking control is thereby enhanced.

The alternate measures consequently taken by control unit 10 or signal processing device 1 may also be made dependent on the frequency of an error. If only a single error occurs, whether due to a short-time interference in the communication between interface 9 and control unit 10 or due to a single erroneous filter coefficient, knocking control may be suspended only briefly, i.e., no additional advancing of the ignition angle takes place under otherwise identical operating conditions. Alternatively, interference in the knocking detection may be considered a single knocking event and responded to by slightly retarding the ignition angle with the operating conditions remaining otherwise identical. If serious interference occurs, in particular if the error frequency rises considerably, more drastic alternate measures must be taken. These may include retarding the ignition angle for safety, i.e., only ranges in which knocking is reliably preventable are allowed for the ignition angle.

What is claimed is:

1. A signal processing device for processing a knocking signal of an internal combustion engine provided by a knocking sensor, comprising:
    an arrangement for receiving control information at an input;
    an arrangement for checking the received control information;
    a memory for storing the control information; and
    an arrangement for checking the stored control information for correctness;
    at least one filter having a property influenceable by the control information, wherein the control information is checked and an alternate measure is taken if the check reveals that the control information is incorrect.

2. The signal processing device as recited in claim 1, wherein the control information includes a filter coefficient.

3. The signal processing device as recited in claim 1, further comprising:
    an arrangement for cooperating with a control unit, wherein the control unit generates the control information, and the control unit influences a combustion process in the internal combustion engine on the basis of the knocking signal.

4. The signal processing device as recited in claim 1, wherein alternate values are used for the control information as an alternate measure, and the alternate values are one of read from the memory and calculated from non-erroneous control information.

5. A control unit for cooperating with a signal processing device including at least one filter having a property influenceable by control information, the control information being checked and an alternate measure being taken if the check reveals that the control information is incorrect, the control unit comprising:
    an arrangement for receiving a measurement message of the signal processing device, the measurement message containing information derived from a knocking signal;
    an arrangement for checking the measurement message for errors and initiating the alternate measure in the event of an error; and
    an arrangement for generating and outputting the control information to the signal processing device.

6. The control unit as recited in claim 5, further comprising:
    an arrangement for checking the measurement message to determine whether the measurement message was corrupted during transmission from the signal processing device to the control unit.

7. The control unit as recited in claim 5, further comprising:
    an arrangement for checking the measurement message to determine whether the measurement message contains information about an error occurring in the signal processing device.

8. The control unit as recited in claim 5, further comprising:
    an arrangement for taking the alternate measure by influencing an ignition angle that triggers an internal combustion engine.

9. A signal processing device for processing a knocking signal of an internal combustion engine provided by a knocking sensor, comprising:
    an interface to receive control data, including filter coefficients;
    a memory to store the filter coefficients;
    a filter to receive the filter coefficients and to filter, based on the filter coefficients, a received knocking sensor signal; and
    a processing device to check the filter coefficients stored in memory for errors, and responsive to detecting a quantity of errors, causing a correction mechanism to activate.

10. The signal processing device of claim 9, wherein the correction mechanism causes a re-transmission of control data found to have errors.

11. The signal processing device of claim 9, wherein the correction mechanism prevents further adjustments of an ignition angle.

12. The signal processing device of claim 9, wherein the correction mechanism causes the combustion engine to revert an operating state known to prevent knocking.

13. The signal processing device of claim 9, wherein the processing device determines a memory location an error occurs at, and wherein the correction mechanism prevents further use of a memory location, responsive to a quantity of errors being detected at the memory location.

14. The signal processing device of claim 9, wherein the activation of the correction mechanism is performed in response to detecting a quantity of errors during a period of time.

15. The signal processing device of claim 14, wherein the processing device operates in cycles, and the period of time is a quantity of cycles.

16. The signal processing device of claim 14, wherein responsive to the detected quantity of errors during a period of time dropping below a threshold, the correction mechanism is caused to be deactivated.

17. The signal processing device of claim 9, wherein the processing device checks the received control data for errors, and responsive to detecting a quantity of transmission errors, performs a corrective action and causes a re-transmission of control data having errors.

* * * * *

UNITED STATES PATENT AND TRADEMARK OFFICE
CERTIFICATE OF CORRECTION

PATENT NO. : 7,613,562 B2 Page 1 of 1
APPLICATION NO. : 10/541517
DATED : November 3, 2009
INVENTOR(S) : Torno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Nineteenth Day of October, 2010

David J. Kappos
*Director of the United States Patent and Trademark Office*